United States Patent [19]

Griffiths

[11] Patent Number: 4,821,600

[45] Date of Patent: Apr. 18, 1989

[54] LINEAR ACTUATOR TAKE-OFF AND RELEASE APPARATUS

[76] Inventor: Edward E. Griffiths, 3200 Polaris St., Suite 23, Las Vegas, Nev. 89102

[21] Appl. No.: 696,120

[22] Filed: Jan. 29, 1985

[51] Int. Cl.4 .................... F16K 31/05; G05G 9/00; G05G 5/06
[52] U.S. Cl. ........................ 74/625; 74/479; 74/527
[58] Field of Search .................... 74/479, 527, 625

[56] References Cited

U.S. PATENT DOCUMENTS

| | | | |
|---|---|---|---|
| 2,516,642 | 7/1950 | Murphy | 74/479 |
| 2,915,915 | 12/1959 | McKay | 74/479 |
| 4,096,765 | 6/1978 | Cochran | 74/479 |
| 4,240,304 | 12/1980 | Griffiths | 74/479 |
| 4,267,804 | 5/1981 | Rypka | 74/527 |

FOREIGN PATENT DOCUMENTS 721557 1/1955 United Kingdom ................ 74/479

Primary Examiner—Lawrence Staab
Attorney, Agent, or Firm—Linval B. Castle

[57] ABSTRACT

A controlled liner actuator shaft that may be used to open and close hydraulic valves is tapped to control a second valve or the like by an actuator shaft housing selectively lockable to the actuator shaft. An adjustable sleeve on the housing pivotally supports a control handle collar and spaced pivotal connections of the control handle to a stationary member and to the valve to be controlled permits manual control when the shaft housing is released from the shaft, and permits actuator shaft control when the shaft housing is locked to the shaft.

4 Claims, 1 Drawing Sheet

LINEAR ACTUATOR TAKE-OFF AND RELEASE APPARATUS

BRIEF SUMMARY OF THE INVENTION

This invention relates generally to mechanical actuators and in particular to a mechanical apparatus that may be readily attached or released from a longitudinally moving or reciprocating actuator shaft.

The take-off and release apparatus to be described is particularly important for controlling the operation of a mechanical device such as, for example, a hydraulic control valve, from a longitudinally moving shaft that may be actuating a similar mechanical device, e.g. a second control valve. The take-off control apparatus is easily installed and adjusted in the field and thus is valuable as a standby unit in the event of either a breakdown of other similar devices or if an additional control unit is desired.

Briefly described, the take-off and release apparatus of the invention includes a tubular shaft housing that is slideably mounted upon a longitudinally movable actuator or control shaft that may be driven by a piston, the arm on a motor driven clutch, or similar powered device. A threaded tubular member is mounted to the shaft housing and supports a commercially available "over center" locking device that is operable to readily and securely lock the tubular shaft housing to the movable control shaft. A manually operable control handle is pivotally coupled to the tubular shaft housing and, in the preferred embodiment, is pivotally connected to a stationary member and also to a hydraulic control valve. Thus, the valve may be manually operated to open and close the valve when the locking device is released from the movable shaft, and when locked thereto, the valve is operated by the longitudinal movement of the control shaft. Novel adjustment features permit the apparatus to be field adjusted for proper and accurate operation.

BRIEF DESCRIPTION OF THE DRAWINGS

In the drawings which illustrate the preferred embodiment of the invention.

DETAILED DESCRIPTION OF THE PREFERRED EMBODIMENT

Figures 1, 2, 3:
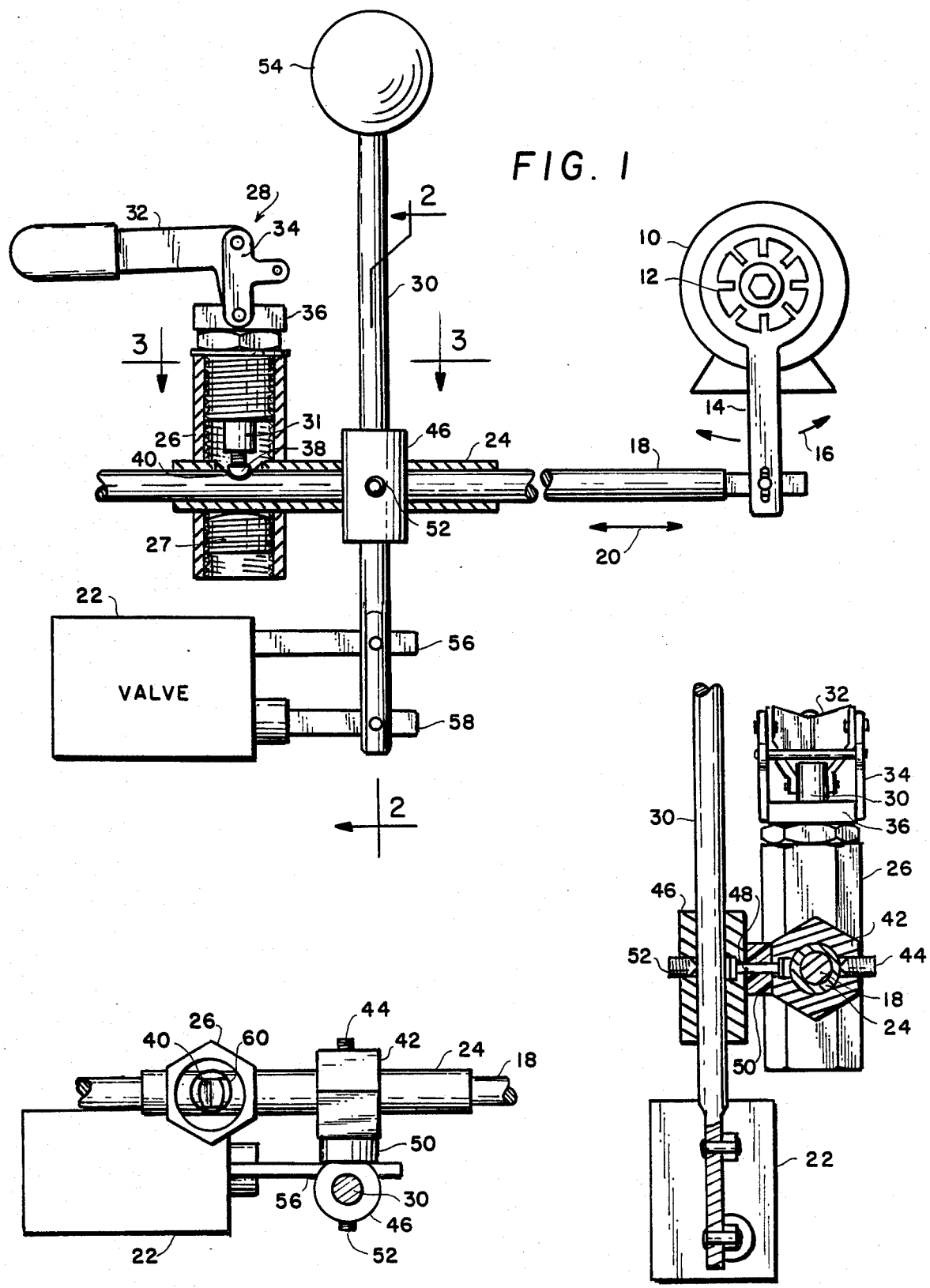
FIG. 1 is a sectional elevational view of the linear actuator take-off and release apparatus.
FIG. 2 is an end view taken along the lines 2—2 of FIG. 1.
FIG. 3 is a plan view taken along the lines 3—3 of FIG. 1 illustrating the take-off apparatus with the shaft locking mechanism removed.

Illustrated in FIG. 1 is a control motor 10 which, in the preferred embodiment, is coupled through a friction clutch 12 to an output arm 14. Rotation of the motor in either direction causes the arm to move as shown by the arrows 16 so that an actuator shaft 18, pivotally coupled to the end of the arm 14, will move longitudinally as shown by the arrow 20. The motor 10 may thus be a position control servomotor that controls the position of a mechanical device such as a hydraulic valve (not shown) through the actuator shaft 18.

The take-off and release apparatus of the invention may be used if it becomes necessary to control a second device such as a second hydraulic valve 22 with the output from the same motor 10 or from a longitudinally moving shaft driven from another power source. This is done in the illustrated embodiment by installing upon the shaft 18 a tubular shaft housing 24 to which is attached a threaded "stand-off" member 26 with an included over-center shaft lock mechanism 28 and a manually operable control lever assembly 30 both of which will subsequently described.

The stand-off member 26 is radially bored to receive the tubular shaft housing 24, as best shown in FIG. 3, and is locked into its position within the radially bored hole by a large set screw 27 in a threaded axial hole in the bottom of the member 26. The stand-off member may then be easily adjusted along the shaft housing 24.

The stand-off member 26 is preferably formed from a hexagonal bar that is axially bored and threaded to receive the threaded exterior of a commercially available over-center locking member 28 such as the type sold under the trademark of De Sta Co. As shown in FIGS. 1 and 2, the upper end of a central locking rod 31 in the locking member 28 is pivotally connected to the ends of "L" shaped bifurcated handle members 32 which are pivotally connected to side plates 34 coupled to the base 36 of the member 28. When the handle is pivoted up to a vertical position, it lifts the locking rod 31; when pivoted down to the horizontal position, as shown, the locking rod is lowered. In the preferred embodiment, the locking rod 31 has been altered to provide a length adjustment of the rod by drilling the threading an axial hole in the lower end of the rod and inserting therein a hardened round headed machine screw 38. The round head of the adjustment screw 38 fits through a coaxial hole through the wall of the shaft housing 24 and into a slot 40 ground in the top surface of the actuator shaft 18 to thus secure the locking mechanism 28 and its attached tubular shaft housing 24 to the longitudinally movable actuator shaft.

As best illustrated in FIG. 2, a sleeve 42 is longitudinally bored to fit around the exterior of the tubular shaft housing 24 and is secured thereto by a set screw 44 which may be loosened to adjust the location of the sleeve along the housing. A collar 46 is pivotally attached at one side of the sleeve 42 by a suitable screw or rivet 48 and is preferably separated therefrom by a Nylon or Teflon washer 50 to permit firm but easy rotation of the sleeve and movement of the control arm 30. The control arm 30 is positioned within the bore of the collar 46 and is locked therein by a set screw 52 to thereby provide a means for adjusting the position of the control arm.

As shown in FIG. 1, the upper end of the manual control arm shaft is preferably provided with a handle or handle ball 54 and the lower end, opposite the collar 46, is coupled to a controlled mechanism such as the hydraulic valve 22. In the embodiment being described herein, a point near the lower end of the arm 30 is pivotally coupled to a stationary member such as an arm 56 attached to the housing of the valve 22. A second pivotable connection at the lower end of the arm 30, and spaced from the coupling to arm 56, is made to a movable valve controlling member 58. It must be understood that the positions of the controlling member 58 and stationary member 56 may be reversed and either or both members may, if desired, be located above the actuator shaft 18 between the collar 46 and handle ball 54.

In operation, the valve controlling member 58 may be actuated either by the movement of the actuator shaft 18 or by manual operation of the control arm 30. When the over-center lock 28 is released by moving the handle 32 up to a vertical position, the locking shaft 31 and its adjustment screw 38 is lifted from the slot 40 in the movable actuator shaft 18. When the control arm 30 is manually moved, it pivots around the stationary member 56 to actuated the valve controlling member 58 while the tubular shaft housing 24 and the shaft lock assembly 28 slide along the actuator shaft 18. When the over-center lock 28 is engaged by moving the handle down to its horizontal position, the adjustment screw on the end of the locking shaft 31 engages the slot 40 in the top of the actuator shaft 18 to lock the tubular shaft housing 24 to the shaft 18 so that the control arm 30 now follows the movement of the motor driven shaft 18.

It is important to note the several adjusting features of the invention. The set screw 27 in the bottom of the stand-off member 26 may be loosened to permit axial alignment of the radial hole 60 in the tubular shaft housing 24 and, when the take-off and release assembly is removed from the actuator shaft 18, the length adjustment of the screw 38 in the end of the locking rod 31 of the over-center lock 28. The set screw 44 may be loosened to adjust the position of the sleeve 42 along the shaft housing 24 and hence the vertical alignment of the control arm 30. And the set screw 52 permits vertical adjustment of the control arm 30 between the actuator shaft 18 and the valve 22.

It is also important to note that the various components need not be positioned as described in the preferred embodiment. For example, the over-center shaft lock 28 and/or the control arm 30 and valve 22 assembly may be positioned on their sides and/or the actuator shaft may be vertically movable instead of horizontally, as described. The invention is to be thus interpreted according to the appended claims.

What is claimed is:

1. A mechanism for effecting the coupling and release of control apparatus from a linearly moveable actuator shaft, said mechanism comprising:
   a tubular shaft housing slidably supported on the external surface of the linearly moveable actuator shaft;
   actuator take-off means adjustable along said shaft housing, said take-off means being attachable to the control apparatus for actuating said apparatus in accordance with the movement of said actuator shaft;
   locking means connected to said shaft housing for securing said housing to and releasing said housing from a precise predetermined point along said moveable actuator shaft, said locking means including a tubular member having a threaded bore and a diametric hole for accommodating said shaft housing, said housing being locked into a predetermined position in said tubular member by a set screw threaded into the bore of the first end of said member, the second end of said member supporting locking mechanism having a shaft axially extendible in the bore of said member and through an opening in the surface of said shaft housing to foreceably contact sad predetermined point on said actuator shaft.

2. The mechanism claimed in claim 1 wherein the predetermined point on said actuator shaft is a notch in the surface of said shaft and where the contacting end of said locking mechanism shaft has a bored and threaded axial hole accomodating a machine screw providing a length adjustment for said locking mechanism shaft.

3. The mechanism claimed in claim 1 wherein said actuator take-off means includes a sleeve adjustably slideable along said shaft housing and lockable thereto at a predetermined point by a set screw radially extending through said sleeve to contact said housing.

4. The mechanism claimed in claim 3 further including a control handle adjustably lockable by a set screw in a collar pivotally coupled to said housing sleeve, a first point on said handle spaced from said collar being pivotally coupled to a stationary member and a second point spaced from said collar and said stationary member being pivotally coupled to apparatus to be controlled, whereby said control handle is manually operable when said locking means is released from said actuator shaft and is operable by said linearly moveable actuator shaft when said locking means secures said shaft housing to said shaft.

* * * * *